D. M. CONVERSE.
DETACHABLE GRAIN HEADER.
APPLICATION FILED DEC. 1, 1917.
1,312,388.
Patented Aug. 5, 1919.
4 SHEETS—SHEET 4.
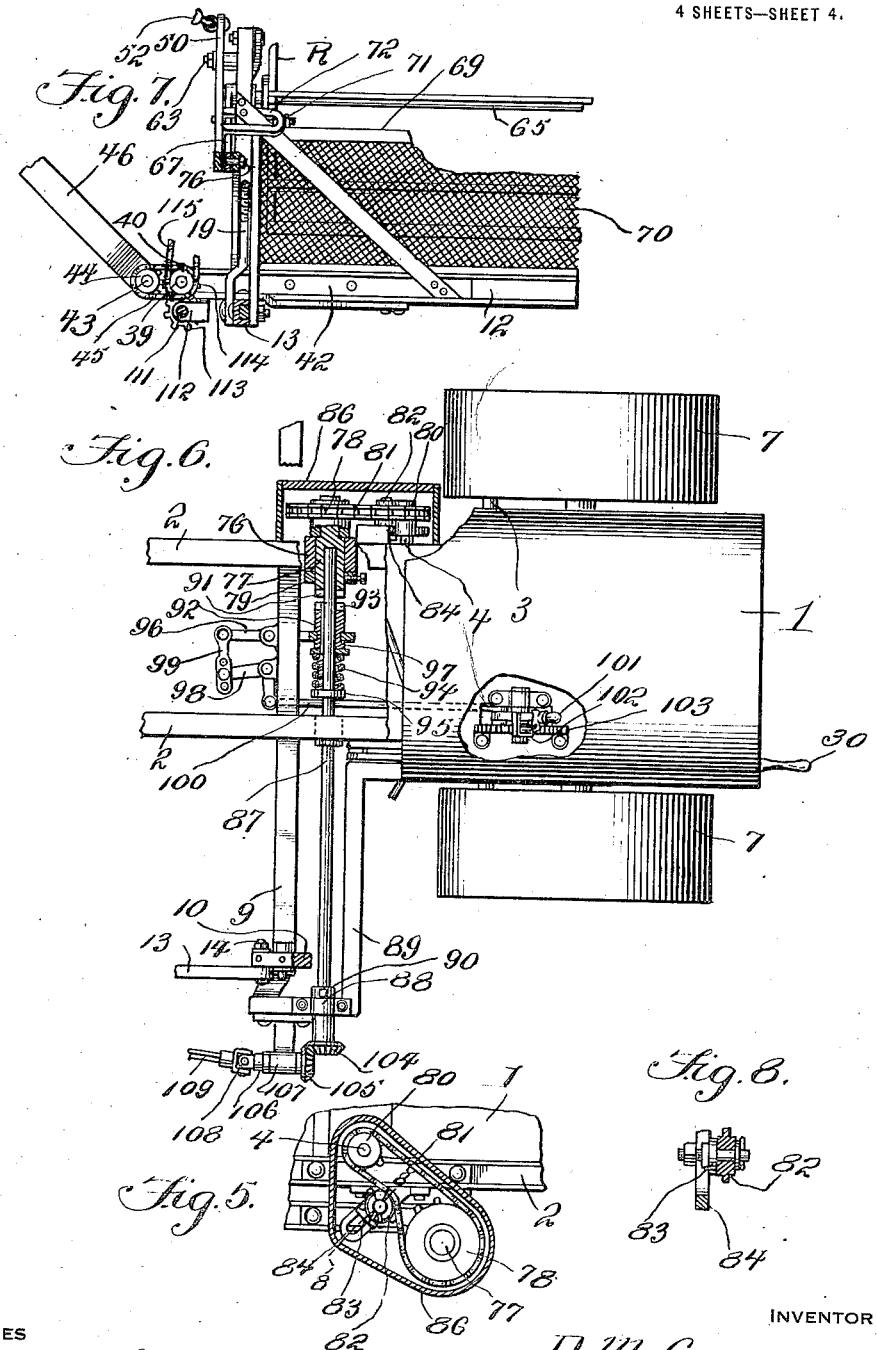
WITNESSES
INVENTOR
D. M. Converse
BY Victor J. Evans
ATTORNEY

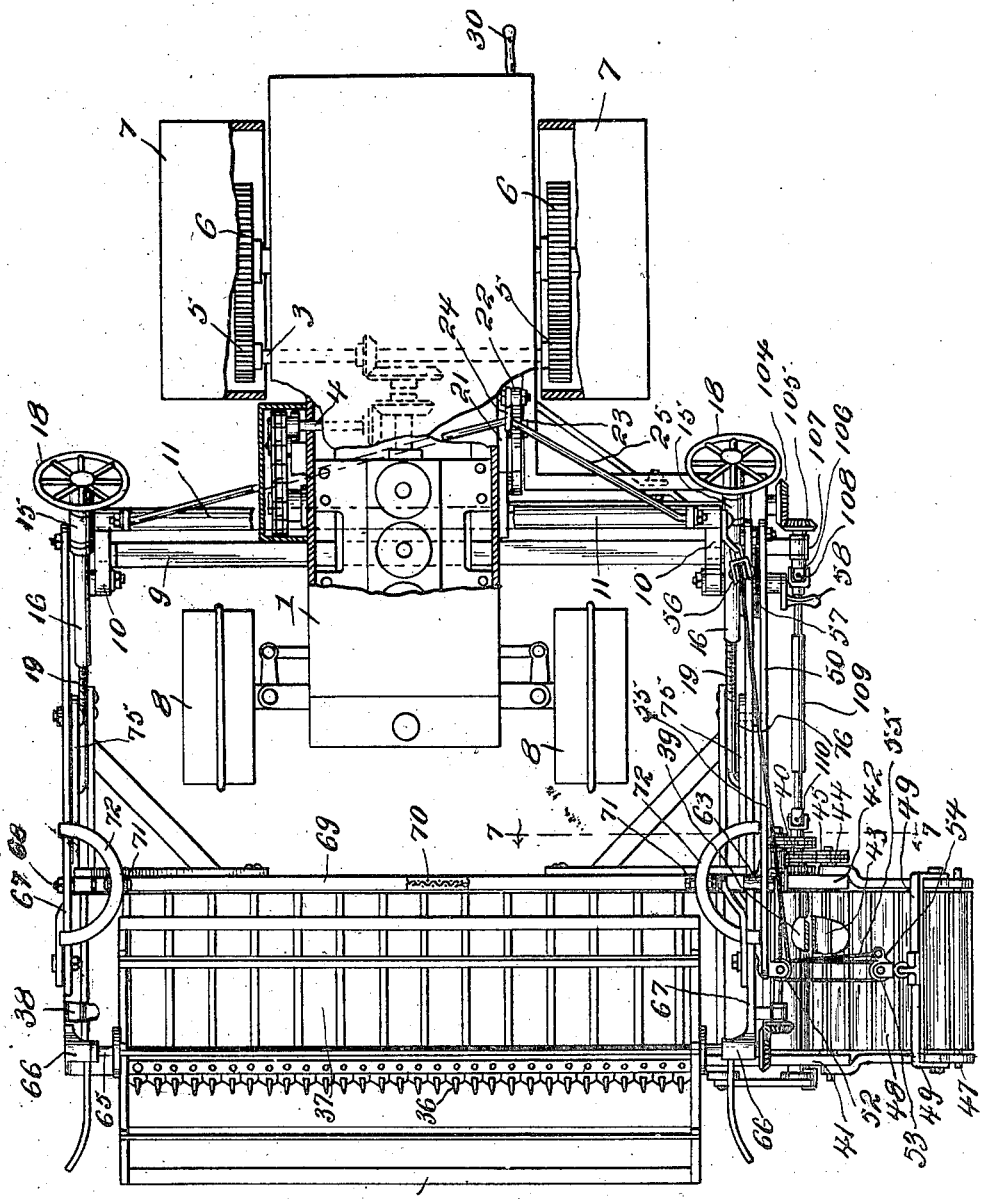

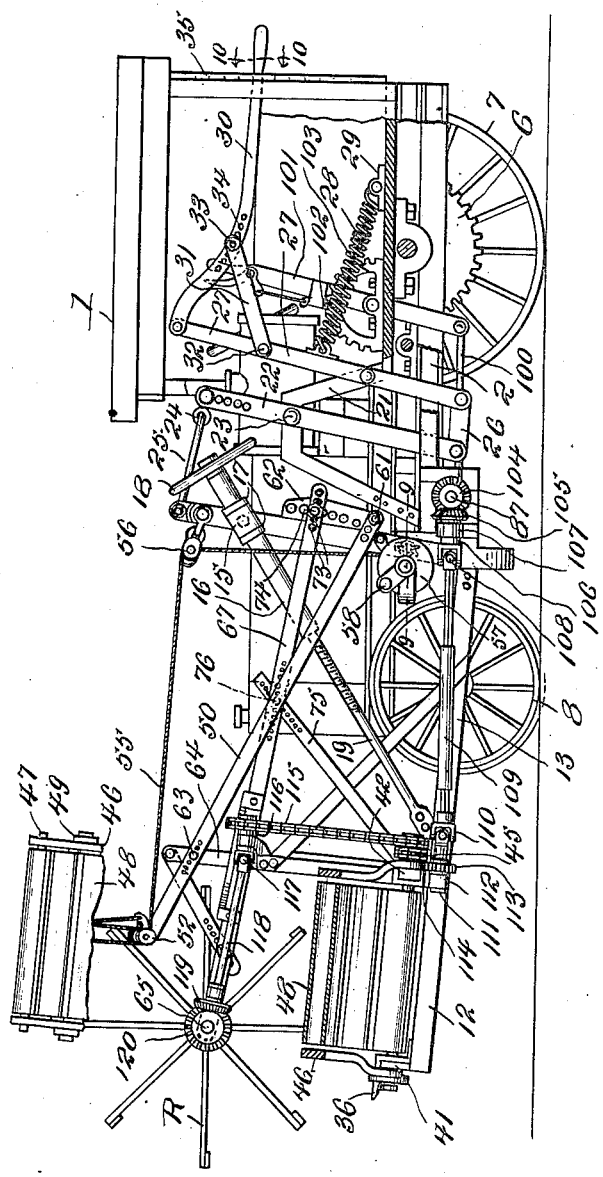

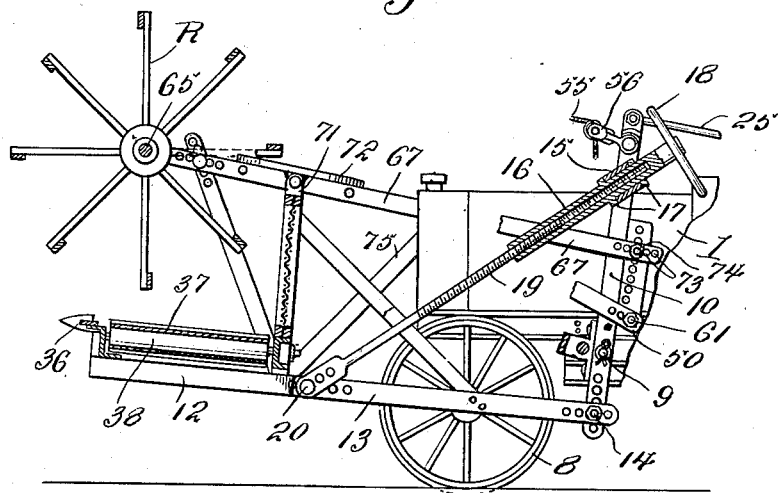
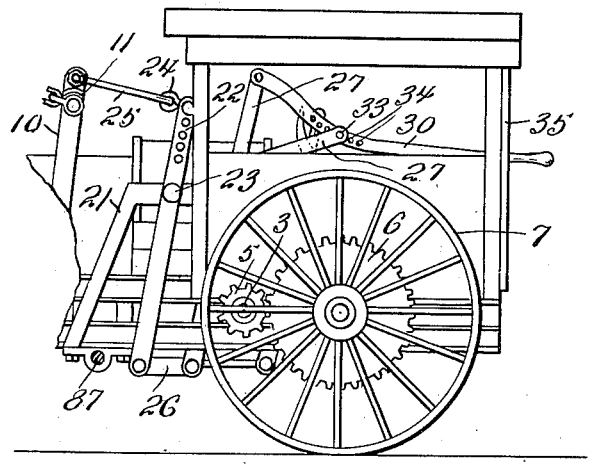
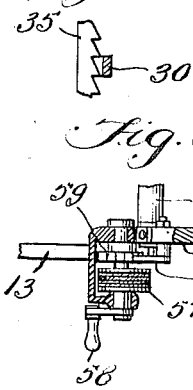
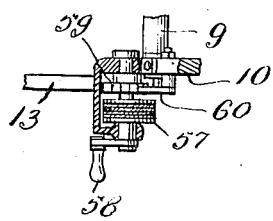

UNITED STATES PATENT OFFICE.

DAN M. CONVERSE, OF ALBERT, KANSAS.

DETACHABLE GRAIN-HEADER.

1,312,388.     Specification of Letters Patent.     Patented Aug. 5, 1919.

Application filed December 1, 1917. Serial No. 204,936.

*To all whom it may concern:*

Be it known that I, DAN M. CONVERSE, a citizen of the United States, residing at Albert, in the county of Barton and State of Kansas, have invented new and useful Improvements in Detachable Grain-Headers, of which the following is a specification.

My invention relates particularly to grain headers which are adapted to be installed upon traction engines, and has for its objects; first, to provide an efficient grain header of such an adjustable nature that it may be installed upon almost any traction engine with a minimum amount of labor and expense, secondly, to provide a grain header which may be tilted up out of the way and rendered inactive so that the tractor may be easily driven about from place to place, thirdly, to provide a grain header of such an adjustable nature that the platform of the same may be set to cut the stalk of grain at different heights from the ground, the adjustment being such that the platform is maintained approximately horizontal so that the header may work most efficiently in any of its adjusted positions, fourthly, to provide disengageable means for driving the header mechanism from the motor to the tractor.

A further object of my invention is to provide a grain header of such a construction that it may be mounted upon a tractor in a very compact manner.

With these and other objects in view which will be hereinafter fully described and particularly pointed out in the claims, the invention consists in the novel arrangement and construction of parts illustrated in the accompanying drawings forming a part of this specification, in which:—

Figure 1 is a plan view, with parts broken away, of a tractor of usual construction to which a grain header embodying my invention has been attached.

Fig. 2 is a side elevation of the same.

Fig. 3 is a side elevation of the tilting header frame.

Fig. 4 is a side elevation of the means for controlling the tilting frame from the cab of the tractor.

Fig. 5 is a partially sectional side elevation of the driving means of the header mechanism.

Fig. 6 is a top plan view of a portion of the header driving mechanism.

Fig. 7 is a sectional detail view taken on the line 7—7 in Fig. 1.

Fig. 8 is a sectional detail view taken on the line 8—8 in Fig. 5.

Fig. 9 is a sectional detail view taken on the line 9—9 in Fig. 2.

Fig. 10 is a sectional detail view taken on the line 10—10 in Fig. 2.

Like characters of reference indicate like parts in the various views.

In the drawings 1 indicates generally a tractor of usual construction having a frame 2 upon which is mounted an internal combustion motor. The motor is connected to transverse shafts 3 and 4, the shaft 3 having a pinion 5 upon its outer end engaging a gear 6 mounted upon the driving wheel 7 of the tractor. The drive shaft 3 is connected up with the motor in the usual way with a clutch element of usual construction to control the driving relation with said shaft. The front wheels 8 of the tractor are mounted for pivotal movement to steer the tractor and are controlled in the usual manner from the cab of the tractor.

Secured on the tractor frame intermediate the front and rear wheels is a transverse bar 9 which extends materially beyond the wheels at both sides of the tractor. Said cross bar, which is called the pivot bar, supports adjacent to each end thereof a pivoted arm 10, said arms being connected together and spaced apart at their upper ends by a cross bar 11. The header platform 12 is provided at the two sides thereof with rearwardly extending arms 13, the rearward ends of which are adjustably connected with the lower ends of the arms 10, by means of uprights 14 for the reception of which the arms 10 and 13 are each provided with a plurality of apertures, thus enabling the header platform to be adjusted longitudinally as well as vertically with respect to the arms 10. Pivoted on each arm 10 near the upper end thereof is a bearing sleeve 15 in which an internally threaded tube 16 is supported for rotation, said tube being provided with thrust collars 17 to prevent lengthwise movement of the bearing sleeve, while said tube is free to be rotated in said sleeve by means of a hand wheel 18 at the upper end thereof. Threaded into the tube 16 is a rod 19, the lower end of which is pivotally connected with one of the arms 13 by means of a bolt or pivot member 20 for the reception of which the rods 19 and the arms 13 are each preferably provided with a plurality of apertures to enable proper adjustment to be made. The header platform will thus be adjustably supported by the arms 10 in such a manner that by rocking said arms 10 about the axis of the pivot bar 9 the header platform may be raised or lowered as required.

Suitably mounted on one side of the tractor frame is a substantially A-shaped bracket 21 on which a lever 22 is mounted by means of a pivot 23. The upper end of the lever 22 carries an eye 24 which receives the bight of a yoke 25, the terminals of which are connected with the arms 10 adjacent to the upper ends of the latter. The downwardly extending arm of the lever 22 is connected by a link 26 with the lower end of a lever 27, also fulcrumed on the bracket 21, and by means of which the lever 22 may be rocked to produce a rocking movement of the arms 10, whereby the header platform may be raised or lowered. For the purpose of assisting in this operation by counterbalancing the weight of the header frame a retracting spring 28 is provided, said spring being connected at one end with the upwardly extending arm of the lever 27 and at the other end with the floor of the tractor as seen at 29. The lever 27 has an actuating arm or handle 30 which is pivotally connected with the upper end of said lever, said arm or handle being secured in position for operation by means of a brace 31, one end of which is pivoted on the lever, as seen at 32, the other end of said brace being adjustably connected with the handle by means of a bolt 33 for the passage of which a plurality of perforations 34 are provided to enable said arm to be raised or lowered to the most convenient position for operation. The arm or handle 30 engages a ratchet bar 35 with which it is held in engagement by the weight of the header frame, the latter being thus secured in position at the desired elevation.

The header platform is provided with the customary sickle or cutting apparatus 36 as well as with the apron or carrier 37, the latter being trained over rollers adjacent to the two ends of the platform, one of said rollers being seen at 38 in Fig. 3. The other roller, one of the terminals of which is seen at 39 in Fig. 7 carries a sprocket wheel 40. Brackets 41—42 on the front and rear sides of the header platform carry a roller 43 on one terminal of which is mounted a sprocket wheel 44. A chain 45, seen in Figs. 1 and 7 which is trained over the sprockets 40 and 44 transmits motion from the roller 39, which is driven in a manner to be hereinafter described, to the roller 43.

Supported for swinging movement on the terminals of the roller 43 is an elevator frame 46, said frame having at the upper end thereof a roller 47. A slatted apron or carrier 48 is trained over the rollers 43 and 47. Pivotally connected with the upper end of the elevator frame is a yoke 49. A supporting bar 50 at one side of the elevator frame carries at its forward end a pulley block 52, a similar pulley block 53 being carried by the yoke 49. Connected with a bracket 54 extending at one side of the pulley block 53 is one end of a rope 55, the other end of which after being reeved through the pulley blocks 52 and 53 and over a guide pulley 56 supported near the upper end of one of the arms 10 is connected with a drum 57 which is supported on the tractor frame and which has a crank handle 58, whereby it may be rotated, said drum being equipped with a ratchet 59 engaged by a pawl or detent 60, whereby reverse movement of the drum will be prevented. It will be readily seen that by rotating the drum 57 the free end of the elevator frame may be raised or lowered. The rear end of the bar or lever 50 is secured by means of a bolt 61 to a bracket 62 mounted on one of the arms 10. The forward end of the supporting bar 50 is secured by a bolt 63 to an upright 64 on the header frame. Provision is preferably made for the longitudinal adjustment of the bar 50 by providing said bar with a plurality of perforations for the passage of bolts 61 and 63.

The reel R is carried by a shaft 65 which is supported for rotation in bearings 66 on a pair of arms or levers 67 which are pivotally supported as shown. A frame 69 of solid construction rises from the rearward portion of the header platform, said frame carrying a screen 70 to prevent the grain from being thrown rearwardly over the header platform by the action of the reel. Supported pivotally on the frame 69 in axial alinement with the pivots 68 are guides 71, each of which receives a semi-circular brace 72 connected with one of the levers 67, the purpose of this construction being to prevent endwise play of the reel. The rearward ends of the levers 67 are adjustably connected with the brackets 62 carried by the arms 10, said brackets being each provided with a plurality of perforations 73 for the passage of the connecting bolt 74. For the purpose of further reinforcing the construction each arm or lever 67 may also be adjustably connected with a brace 75 by means of a bolt 76. Provision is made for the adjustability of the connections between the reel carrying members and their supports in order to enable the header frame to be adjusted as may be required by means of the extensible brace members including the threaded tubes 16 and the threaded rods 19.

Mounted on the tractor frame adjacent to the outer end of the shaft 4 is a bearing 76.

A hollow sleeve 77 is journaled in said bearing and has a sprocket wheel 78 secured to its outer end. The hub of the sprocket wheel abuts on one end of the box or bearing 76, and the sleeve or socket 77 has a thrust collar 79, thereby preventing lengthwise movement of the sleeve or socket. The shaft 4 carries a sprocket 80 which is in alinement with the sprocket wheel 78, and a chain 81 is trained over said sprockets. An idle sprocket 82 is rotatably mounted on a bracket 83 and engages the under stretch of the chain 81. The bracket 83 is mounted in a slide 84 which is secured to the frame of the tractor, and an adjusting screw 85 which engages a hole in a projection in said slide and is screw threaded into the bracket 83 serves to secure the said bracket in any adjustment, thereby enabling the sprocket 82 to be positioned so as to take up the slack of the chain 81. A casing 86 incloses the sprockets and chain and serves to exclude dust and dirt therefrom.

A shaft 87 has its inner end journaled in the bore of the sleeve or socket. The other end of the shaft 87 is supported in a bearing 88 on a bracket 89 attached to the tractor frame. A thrust collar 90 is provided to prevent lengthwise movement of the shaft 87. The sleeve or socket 77 is provided with clutch jaws 91. A sleeve 92 is slidably keyed to the shaft 87, and has clutch jaws 93 formed thereon adapted to engage the clutch jaws 91 of the socket member 77. A spiral spring 94 surrounds the shaft 87 and is disposed between the end of the sleeve 92 and a collar 95 secured to the shaft. The tension of this spring is normally exerted against the sleeve 92, causing the engagement of the clutch jaws of said sleeve with the clutch jaws on the socket member 77. A lever 96 is pivoted on the tractor frame, said lever having a fork provided with studs that engage an annular groove 97 formed in the sleeeve 92. A bell crank lever 98 is pivotally mounted on the tractor frame, and a link 99 connects said bell crank lever to the lever 96. The other arm of the bell crank lever is connected to an adjustable rod 100 which extends in a rearward direction and is connected to the lower end of a hand lever 101 pivoted on the tractor frame. The hand lever 101 has a spring latch 102 mounted thereon to engage the teeth of a stationary quadrant 103, whereby the hand lever may be retained in postion at various adjustments, thereby controlling the clutch.

The shaft 87 carries at its outer end a bevel pinion 104 meshing with a bevel pinion 105 and a shaft 106 which is supported in a bearing 107 in a position at right angles to the shaft 87. The shaft 106 is connected by a universal joint 108 with one end of a telescopic shaft 109, the other end of which is connected by a universal joint 110 with a shaft 111 supported in a bearing 112 on the header platform. The shaft 111 has a pinion 113 meshing with a pinion 114 and with the roller 39, thereby driving said roller and the platform apron which is trained thereover as well as the apron or carrier of the elevator. Motion is also transmitted from the roller 39 through the medium of a chain 115 to a shaft 116 which is connected by a universal joint 117 with one end of a shaft 118, the other end of which carries a bevel gear 119 meshing with a bevel gear 120 on the shaft that carries the reel R, thereby driving said reel.

What is claimed is:—

1. A tractor frame, steering wheels, connected with said frame, a transverse pivot bar mounted on the frame in rear of the steering wheels and extending laterally beyond the sides thereof, upright arms pivoted on the end portions of said bar and extending above and below the same, a header frame positioned transversely in front of the tractor frame and having rearwardly extending arms pivotally connected to the upright arms below the pivot bar, endwise adjustable braces interposed between the upper portions of the upright arms and the forward portions of the rearwardly extending arms, and means for rocking and adjustably fixing said arms.

2. A tractor frame, steering wheels connected with said frame, a transverse pivot bar mounted on the frame in rear of the steering wheels and extending laterally beyond the sides thereof, upright arms pivoted on the end portions of said bar and extending above and below the same, a header frame positioned transversely in front of the tractor frame and having rearwardly extending arms pivotally connected to the upright arms below the pivot bar, means interposed between and connecting the upper portions of the upright arms and the forward portions of the rearwardly extending arms, and means for rocking and adjustably fixing said arms.

3. A tractor frame, a transverse pivot bar mounted thereon and extending laterally beyond the sides thereof, substantially vertical arms pivoted on the ends of said bar, means for rocking said arms and for securing them at various adjustments, a header frame disposed transversely in advance of the tractor and having rearwardly extending arms, pivots connecting said arms with the lower ends of the vertical arms below the pivot bar, and brace means adjustably connecting the upper ends of the vertical arms with the header frame to enable the angle of the latter to be varied with respect to the vertical arms, said brace means including bearing sleeves pivoted on the upright arms, internally threaded tubes journaled and held against endwise movement in said bearing sleeves and having handles at their upper ends, and rods having their lower ends pivotally connected with the header frame and their upper ends in threaded engagement with said tubes.

4. A tractor frame, steering wheels connected with said frame, a transverse pivot bar mounted on the frame in rear of the steering wheels and extending laterally beyond the sides thereof, upright arms pivoted on the end portions of said bar and extending above and below the same, a header frame positioned transversely in front of the tractor frame and having rearwardly extending arms pivotally connected to the upright arms below the pivot bar, means interposed between and connecting the upper portions of the upright arms and the forward portions of the rearwardly extending arms, means for rocking and adjustably fixing said arms, and retractile spring means connected with one of the upright arms and extending rearwardly therefrom and connected with the tractor frame.

5. A tractor frame, a pivot bar supported transversely thereon and extending laterally beyond the sides thereof, substantially vertical arms pivoted at intermediate points on the ends of said bar, a header frame connected with said arms, below the pivot bar, for angular adjustment with respect to the arms, a bracket mounted on one side of the tractor frame, a lever fulcrumed on said bracket, a yoke connecting the upper end of said lever with the upper ends of the vertical arms, a second lever fulcrumed on the tractor frame, a link connecting the lower end of the second lever with the lower end of the first mentioned lever, a retractile spring connecting the upwardly extending arm of the second lever with the floor of the tractor, a handle pivotally connected with the upper end of the second lever, a brace connecting said handle adjustably with the upwardly extending arm of said second lever, and a ratchet bar engaged by said handle to retain the adjusting levers and the header frame in position at various adjustments.

6. A tractor frame, steering wheels connected therewith, a transverse pivot bar supported on the frame in rear of the said wheels and extending laterally from the frame, substantially vertical arms pivoted on said bar and extending above and below the same, means for rocking said arms and for retaining them at various adjustments, a header frame adjustably connected with the lower portions of the rocking arms and carried thereby, reel carrying arms pivoted on the header frame, means for adjustably connecting said reel carrying arms with the upper portions of the rocking vertical arms, a reel supported for rotation in bearings on the reel carrying arms, semicircular braces connected with the reel carrying arms, and pivoted supports for said braces.

7. A tractor frame, steering wheels connected therewith, a transverse pivot bar supported on the frame in rear of said wheels and extending laterally from the frame, substantially vertical arms pivoted on the ends of said bar, means for rocking said arms and for retaining them at various adjustments, a header frame adjustably connected with the rocking arms below the pivot bar and carried by said arms, reel carrying arms pivoted on the header frame, means for adjustably connecting said reel carrying arms with the upper portions of the rocking vertical arms, a reel supported for rotation in bearings on the reel carrying arms, semicircular braces connected with the reel carrying arms, and pivoted supports for said braces, in combination with means for driving the moving parts of the header, including the reel, by power transmitted from the tractor.

8. A tractor frame, steering wheels connected with said frame, a header frame positioned transversely in front of the tractor frame, a vertically rocking or swinging frame carrying the header frame and having upright arms pivoted at intermediate points in their length along side the tractor frame and also having arms extending forwardly from the lower portions of the upright arms, means interposed between and connecting the upper portions of the upright arms and the forward portions of the rearwardly extending arms, and means for adjustably fixing the vertically rocking or swinging frame.

9. The combination of a wheeled frame, upright arms pivotally mounted at intermediate points in their length on said frame, a header in front of the frame and having rearwardly extending arms pivotally connected to the lower portions of the upright arms, means connecting the upper portions of the upright arm and the forward portions of the rearwardly extending arms, and means for rocking and adjustably fixing the upright arms.

In testimony whereof I affix my signature.

DAN M. CONVERSE.